United States Patent
Fujikawa et al.

(10) Patent No.: US 10,436,892 B2
(45) Date of Patent: Oct. 8, 2019

(54) RADAR APPARATUS

(71) Applicant: FURUNO ELECTRIC CO., LTD., Nishinomiya (JP)

(72) Inventors: Takumi Fujikawa, Sanda (JP); Yugo Kubota, Asiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 288 days.

(21) Appl. No.: 15/268,352

(22) Filed: Sep. 16, 2016

(65) Prior Publication Data
US 2017/0082742 A1 Mar. 23, 2017

(30) Foreign Application Priority Data

Sep. 17, 2015 (JP) .................................. 2015-183764

(51) Int. Cl.
*G01S 13/522* (2006.01)
*G01S 7/06* (2006.01)
(Continued)

(52) U.S. Cl.
CPC ............ *G01S 13/522* (2013.01); *G01S 7/062* (2013.01); *G01S 7/24* (2013.01); *G01S 7/292* (2013.01);
(Continued)

(58) Field of Classification Search
CPC .. G01S 13/522; G01S 13/956; G01S 13/9307; G01S 7/062; G01S 7/292; G01S 13/89; G01S 7/24; G01S 13/426; G01S 2013/0245; Y02A 90/18
USPC ....................................................... 342/159
See application file for complete search history.

(56) References Cited

U.S. PATENT DOCUMENTS 3,050,723 A * 8/1962 Atlas ....................... G01S 13/95
342/26 R
6,043,756 A 3/2000 Bateman et al.
(Continued)

FOREIGN PATENT DOCUMENTS

JP 2002-062349 A 2/2002
JP 2002-116249 A 4/2002
(Continued)

OTHER PUBLICATIONS

European Search Report dated Jan. 18, 2017 in EP Application No. 16189301.1, 10 pgs.

*Primary Examiner* — Frank J McGue
(74) *Attorney, Agent, or Firm* — Knobbe, Martens, Olson & Bear LLP

(57) ABSTRACT

A radar apparatus (1) for creating a radar image based on reflection waves caused by radio waves transmitted from an antenna, is provided. The radar apparatus (1) includes a receiver (3) configured to receive the reflection waves of the transmitted radio waves, as reception signals, a suppression processing module (9) configured to suppress levels of reflection signals among the reception signals, each of the reflection signals caused by precipitation, a precipitation reflection visualizing data creating module (15) configured to create data indicating, as a precipitation reflection visualized area (97), an area corresponding to the signals of which levels are suppressed to below a threshold by the suppression processing module (9), and a display image data creating module (16) configured to create display image data indicating on the radar image, the precipitation reflection visualized area (97) created by the precipitation reflection visualizing data creating module (15).

18 Claims, 2 Drawing Sheets

Figure 1:
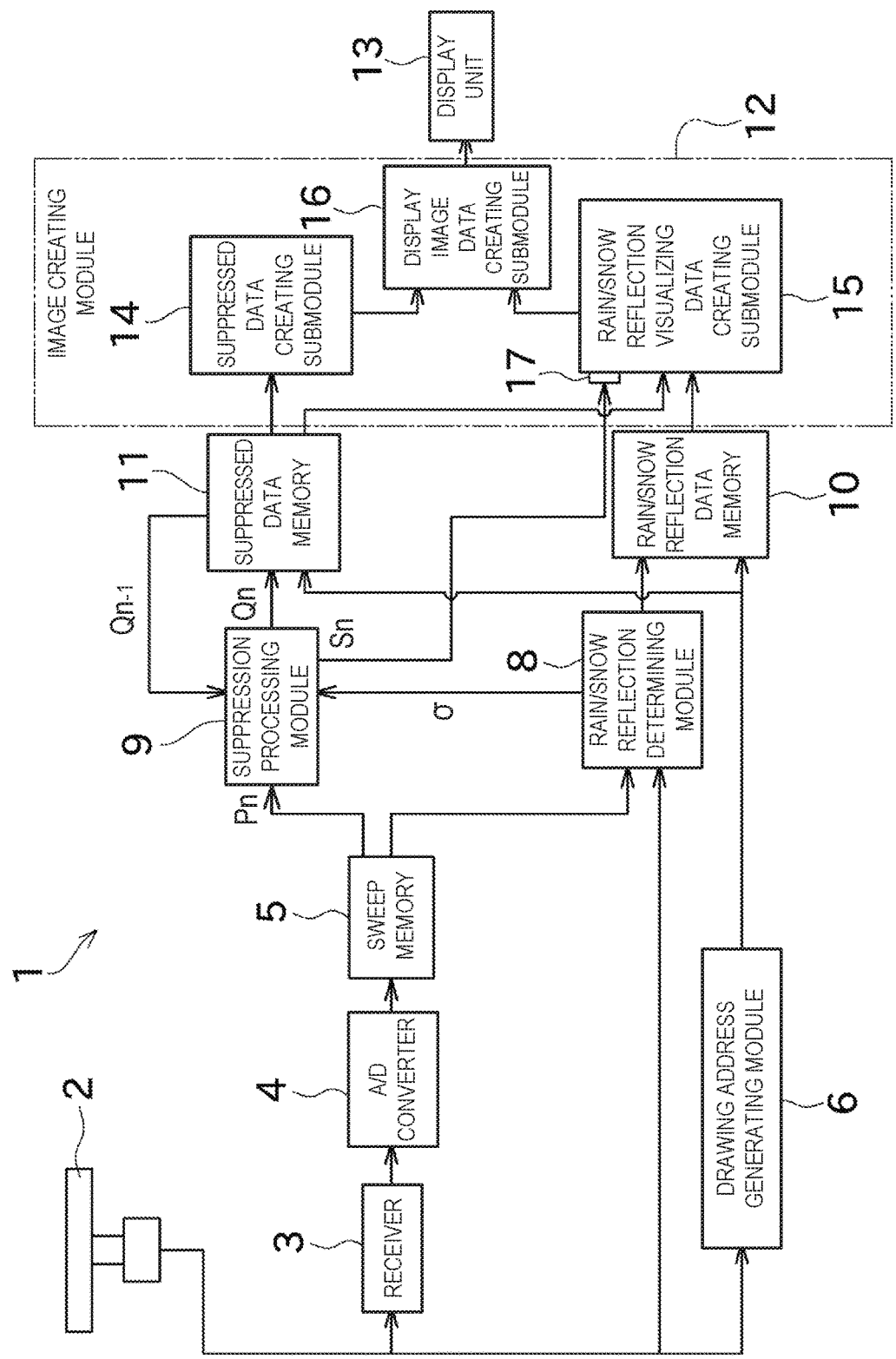

(51) Int. Cl.
*G01S 7/24* (2006.01)
*G01S 13/89* (2006.01)
*G01S 7/292* (2006.01)
*G01S 13/42* (2006.01)
*G01S 13/93* (2006.01)
*G01S 13/95* (2006.01)
*G01S 13/02* (2006.01)

(52) U.S. Cl.
CPC ............ *G01S 13/426* (2013.01); *G01S 13/89* (2013.01); *G01S 13/9307* (2013.01); *G01S 13/956* (2013.01); *G01S 2013/0245* (2013.01); *Y02A 90/18* (2018.01)

(56) References Cited

U.S. PATENT DOCUMENTS

| | | | |
|---|---|---|---|
| 6,512,477 B2 | 1/2003 | Suzuki | |
| 8,264,395 B2 * | 9/2012 | Fujikawa | G01S 7/414 342/26 R |
| 8,717,228 B2 | 5/2014 | Nishiyama | |
| 8,866,666 B2 | 10/2014 | Nakahama | |
| 2010/0321231 A1 * | 12/2010 | Nakahama | G01S 7/062 342/118 |
| 2011/0109492 A1 | 5/2011 | Nakahama | |
| 2012/0127019 A1 | 5/2012 | Nishiyama | |
| 2015/0302622 A1 | 10/2015 | Takechi et al. | |

FOREIGN PATENT DOCUMENTS

| | | |
|---|---|---|
| JP | 2002-536627 A | 10/2002 |
| JP | 2010-181335 | 8/2010 |
| JP | 2011-002425 A | 1/2011 |
| JP | 2011-099836 A | 5/2011 |
| JP | 2012-108057 A | 6/2012 |
| KR | 1020140075881 A | 6/2014 |

* cited by examiner

RADAR APPARATUS

CROSS-REFERENCE TO RELATED APPLICATION(S)

This application claims priority under 35 U.S.C. § 119 to Japanese Patent Application No. 2015-183764, which was filed on Sep. 17, 2015, the entire disclosure of which is hereby incorporated by reference.

TECHNICAL FIELD

This disclosure relates to a radar apparatus, which displays a signal reflected from rain or snow (rain/snow reflection signal) to be distinguishable from other signals displayed thereon.

BACKGROUND

Conventionally, radar apparatuses are known, which are capable of detecting a region where a rain/snow reflection signal is generated, by discriminating the rain/snow reflection signal from a signal obtained from a target object (e.g., a ship or land). JP2010-181335A discloses this type of a radar apparatus.

The radar apparatus of JP2010-181335A transmits radio waves while rotating an antenna and generates a radar image based on reflection waves caused by the transmitted radio waves, and includes a receiver and a rain/snow reflection determining module. The receiver receives the reflection waves caused by the transmitted radio waves. The rain/snow reflection determining module determines whether the signals received by the receiver are rain/snow reflection signals by using a variation of the signal level (echo intensity) per unit of a given distance, azimuth, or a combination thereof.

Further, in Paragraph [0052] etc. of JP2010-181335A, a configuration is disclosed in which the levels of the reception signals determined as the rain/snow reflection signals by the rain/snow reflection determining module are suppressed so that when displayed, the levels (echo intensities) of the reception signals are not reflected as they are in corresponding pixels to a rain/snow reflection region on the radar image. Moreover, in FIG. 9 of JP2010-181335A, an image example in which only the rain/snow reflection region is extracted on the radar image is disclosed.

However, with the configuration of JP2010-181335A, although the reflection waves in the rain/snow reflection region can effectively be suppressed, the existence of rain or rain cloud is not displayed here. Therefore, to a user who wants to obtain information of rain or snow, there still is a room for improvement.

SUMMARY AND EFFECTS

The purpose of this disclosure relates to displaying a rain/snow reflection region which is conventionally uneasy or not able to be visually recognized on a radar image since signal levels are suppressed, in a visually recognizable mode along with a radar image illustrating a region where a target object (land, a ship, etc.) is estimated to exist, so that a user can confirm on the radar image, existence of the target object and also rain cloud.

According to one aspect of this disclosure, a radar apparatus with the following configuration is provided. Specifically, the radar apparatus creates a radar image based on reflection waves caused by radio waves transmitted from an antenna. The radar apparatus includes a receiver, a suppression processing module, a precipitation reflection visualizing data creating module, and a display image data creating module. The receiver receives the reflection waves of the transmitted radio waves, as reception signals. The suppression processing module suppresses levels of reflection signals among the reception signals, each of the reflection signals caused by precipitation. The precipitation reflection visualizing data creating module creates data indicating, as a precipitation reflection visualized area, an area corresponding to the signals of which levels are suppressed to below a threshold by the suppression processing module. The display image data creating module creates display image data indicating on the radar image, the precipitation reflection visualized area created by the precipitation reflection visualizing data creating module.

Thus, a precipitation reflection region which conventionally cannot be seen can be displayed visualized along with the radar image illustrating existence of a target object (land, a ship, etc.), and the user can confirm existence of rain cloud while also confirming the existence of the target object on the radar image.

According to another aspect of this disclosure, a radar apparatus with the following configuration is provided. Specifically, the radar apparatus creates a radar image based on reflection waves caused by radio waves transmitted from an antenna. The radar apparatus includes a receiver, a precipitation reflection determining module, a suppression processing module, a precipitation reflection visualizing data creating module, a suppressed data creating module, and a display image data creating module. The receiver receives the reflection waves of the transmitted radio waves, as reception signals. The precipitation reflection determining module determines whether the reception signals include precipitation reflection signals and determines a region where the reflection signals are originated, as a precipitation reflection region. The suppression processing module suppresses levels of the precipitation reflection signals. The precipitation reflection visualizing data creating module creates data indicating, as a precipitation reflection visualized area, an area that is in the precipitation reflection region and corresponding to the signals of which levels are suppressed to below a threshold by the suppression processing module. The suppressed data creating module creates data indicating as the radar image, based on the levels of the precipitation reflection signals. The display image data creating module creates display image data indicating on the radar image, the precipitation reflection visualized area created by the precipitation reflection visualizing data creating module. Here, in the phrase "the signals of which levels are suppressed", the level of each signal indicates an echo intensity of the reception signal.

Thus, the precipitation reflection region which conventionally cannot be seen on the radar image due to the suppression of the signal level can be displayed along with the radar image illustrating a region where the target object is estimated to exist, and the user can confirm the existence of rain cloud while also confirming the existence of the target object on the radar image. Therefore, a safe navigation can be performed by grasping a marine meteorological situation.

With the radar apparatus described above, the display image data creating module may create the display image data expressing the precipitation reflection visualized area in a particular pattern formed by arranging figures, the figures being superimposed on the radar image. The "figure" here broadly includes shapes formed by arranging a plurality of pixels, for example, this includes lines and dot shapes. In other words, the "particular pattern" includes various patterns, such as dot patterns, hatching patterns, diagonal lines, and checkerboard patterns.

Thus, even if the region where the target object is estimated to exist overlaps with the precipitation reflection region, it becomes easier for the user to find out the existence of both the regions on the radar image. Moreover, by displaying the existence of the rain cloud in the mode clearly different from the mode for the existence of the target object, the discrimination therebetween becomes easy.

With the radar apparatus described above, the display image data creating module may create the display image data expressing the precipitation reflection visualized area as a semi-translucent area, the semi-translucent area being superimposed on the radar image.

Thus, the precipitation reflection visualized area can be displayed without interrupting the image illustrating the existence of the target object on the radar image.

With the radar apparatus described above, the display image data creating module may create the display image data indicating the precipitation reflection visualized area in a different color from a color indicating the reception signals other than the precipitation reflection signals on the radar image.

Thus, the precipitation reflection visualized area can be displayed in a different color from a color indicating the existence of the target object on the radar image, and the precipitation reflection region can be discriminated from the display of the target object much more easily.

With the radar apparatus described above, the suppression processing module may suppress a level of an unnecessary signal among the reception signals by performing a scan correlation in which a level of a signal having a low correlation with a reception signal received previous thereto by the receiver is suppressed.

Thus, the level of the unnecessary signal such as the precipitation reflection or a water surface reflection, which has the low correlation with the reception signal received previously, is suppressed so that the unnecessary signal becomes uneasy or not able to be visually confirmed on the radar image. In this manner, the signals reflected on the radar image can be organized and the visual confirmation thereof becomes easy.

With the radar apparatus described above, the precipitation reflection visualizing data creating module may include a suppressed level acquiring submodule configured to acquire the suppressed level of each of the precipitation reflection signals corresponding to pixels of the precipitation reflection visualized area. The precipitation reflection visualizing data creating module may create the data indicating a position of the precipitation reflection signal in the precipitation reflection visualized area in an emphasized manner as the suppressed amount of the level of the precipitation reflection signal is larger.

Thus, in the precipitation reflection visualized area on the radar image, it can be considered that the precipitation reflection is stronger in the area displayed more emphasized. The user can visually estimate that the heaviness of rain or snow in the precipitation reflection region.

BRIEF DESCRIPTION OF THE DRAWING(S)

Figure 2A:
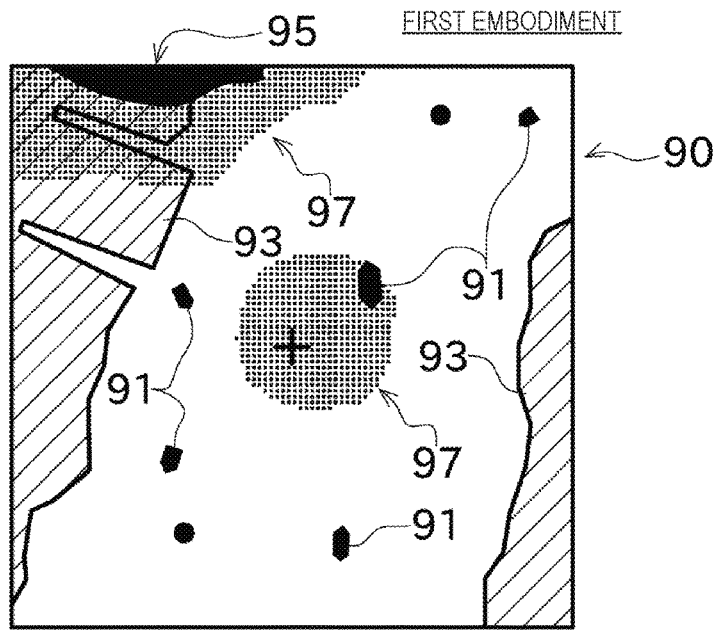
Figure 2B:
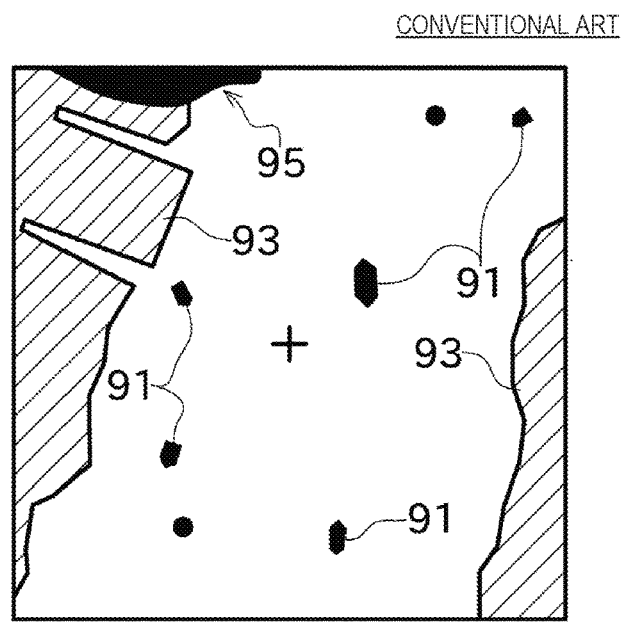

The present disclosure is illustrated by way of example and not by way of limitation in the figures of the accompanying drawings, in which like reference numerals indicate like elements and in which:

FIG. 1 is a block diagram illustrating an overall configuration of a radar apparatus according to one embodiment of this disclosure; and FIG. 2A is a view illustrating an example of display image data generated by the radar apparatus of the embodiment, and FIG. 2B is a view illustrating an example of a radar image generated by a conventional radar apparatus.

DETAILED DESCRIPTION

Embodiments of this disclosure are described with reference to the accompanying drawings. In the following embodiments, an example is illustrated in which this disclosure is applied to a ship. However, the present disclosure may be applied to any kinds of vehicles having a rudder or a similar steering device, such as other watercrafts including boats, vessels, and submarines, as well as land vehicles, airplanes and spaceships. FIG. 1 is a block diagram illustrating an overall configuration of a radar apparatus 1 according to one embodiment of this disclosure. FIG. 2A is a view illustrating an example of display image data generated by the radar apparatus 1 of this embodiment. FIG. 2B is a view illustrating an example of a radar image generated by a conventional radar apparatus.

The radar apparatus 1 of this embodiment is a navigational radar apparatus installed in a ship and used in detecting surrounding thereof (hereinafter, this ship is simply referred to as "the ship"). The radar apparatus 1 transmits radio waves while rotating a radar antenna (antenna) 2 and creates a radar image based on reflection waves caused by the transmitted radio waves. As illustrated in FIG. 1, the radar apparatus 1 mainly includes the radar antenna 2, a receiver 3, an A/D converter 4, a sweep memory 5, a drawing address generating module 6, a rain/snow reflection determining module 8, a suppression processing module 9, a rain/snow reflection data memory 10, a suppressed data memory 11, an image creating module 12, and a display unit 13. Note that here, an example in which a situation around the ship is detected while rotating the radar antenna 2 is described; however, the situation around the ship may also be detected without rotating the radar antenna 2 by using a phased array antenna.

The radar antenna 2 transmits, while rotating in a horizontal plane at a given rotation cycle, the pulse-shaped radio waves (transmission signals) at a different cycle from the rotation cycle, and receives reflection waves from target object(s). Note that, the transmission signal is not limited to the pulse-shaped radio wave, and may be a continuous wave. Further, the radar antenna 2 is not limited to be a single antenna which performs both the transmission and the reception, and may be divided into an antenna for transmission and an antenna for reception.

The receiver 3 detects and amplifies the reception signals (the reflection waves caused by the radio waves) obtained by the radar antenna 2, and outputs them to the A/D converter 4. The A/D converter 4 receives from the radar antenna 2 the analog signals obtained thereby and converts them into digital signals configured by a plurality of bits.

The sweep memory 5 stores the AD-converted reception signals (data) for one sweep in real time. The sweep memory 5 is configured as a buffer which outputs the reception signals for one sweep, to the suppression processing module 9 and the rain/snow reflection determining module 8 before overwriting them with reception signals obtained by the next transmission.

The drawing address generating module 6 generates an address indicating on the radar image expressed in an orthogonal coordinate system, a position of a pixel in which the data in the sweep memory 5 is to be drawn, based on an antenna angle with respect to a given direction (e.g., heading). Since the reception signals for one sweep are aligned in a chronological order (in an increasing order of distance from the ship) in the sweep memory 5, the drawing address (X, Y) generated by the drawing address generating module 6 is sequentially generated to shift away from a starting address ($X_s$, $Y_s$) indicating a position of the ship. The drawing address generating module 6 is comprised of one of hardware and software which realizes Equations 1. The functions of the drawing address generating module 6 and the rain/snow reflection determining module 8, the suppression processing module 9, and the image creating module 12, which are described later, are achieved by executing programs with an FPGA, a CPU, etc. (not illustrated) provided to the radar apparatus 1.

$$X = X_s + r \cdot \cos\theta, \quad Y = Y_s + r \cdot \sin\theta \quad (1)$$

X, Y: Address indicating pixel of radar image
$X_s$, $Y_s$: Address as origin (starting address)
r: Distance from sweep origin
θ: Antenna angle with respect to the given direction The rain/snow reflection determining module 8 determines a region from which rain/snow reflection signals among the signals received by the receiver 3 are originated, to be a rain/snow reflection region. For example, the rain/snow reflection determining module 8 (rain/snow region detecting module) determines whether the reception signals include the rain/snow reflection signals (more specifically, a probability of the reception signals being the rain/snow reflection signals) by receiving an antenna azimuth and sequentially calculating a variation in level of the reception signals in the azimuth direction. Specifically, a known method such as that disclosed in JP2010-181335A may be used.

The suppression processing module 9 of FIG. 1 adjusts (suppresses) levels (echo intensities) of the signals to be reflected in respective pixels of the radar image. The suppression processing module 9 of this embodiment calculates a latest processing result (suppression result) $Q_n$ obtained by the suppression processing module 9, based on a latest reception signal $P_n$ received from the sweep memory 5, a processing result $Q_{n-1}$ obtained by the suppression processing module 9 at a period of time corresponding to one full antenna rotation before the latest processing result is obtained, which is read from the suppressed data memory 11, and a rain/snow reflection probability σ outputted by a rain/snow probability generating module (not illustrated) which is provided to the rain/snow reflection determining module 8.

Specifically, the suppression processing module 9 is comprised of one of hardware and software which executes an operation of Equation 2 described below. The processing of executing Equation 2 can be referred to as a scan correlation in which a level of a signal having a low correlation with a previous reception signal received by the receiver 3 is suppressed. Note that, by suitably determining values of α and β (coefficients of the latest and previous reception signals, respectively), the level of the signal having the low correlation with the previous reception signal (the signal with low correlation is referred to as "the unnecessary signal"), such as a rain/snow reflection or a water surface reflection, can effectively be suppressed.

$$Q_n = \alpha \cdot P_n + \beta \cdot Q_{n-1} \quad (2)$$

α, β: Coefficients determined based on the rain/snow reflection probability σ
n: Scan number As indicated in Equation 2, the suppression processing module 9 uses the rain/snow reflection probability as one of the coefficients of the scan correlation. Therefore, a value which becomes lower than an actual input value as the rain/snow reflection probability is higher is outputted so that the level of the signal to be reflected on the radar image is suppressed and the rain/snow reflection signal is suppressed corresponding to the rain/snow reflection probability. Thus, the suppression processing module 9 suppresses the level of the unnecessary signal, such as the rain/snow reflection signal, and adjusts the level of the signal to be reflected in each pixel of the radar image. Since the suppression is performed at the suppression processing module 9, the unnecessary signal is not preferentially and explicitly displayed on the radar image.

The rain/snow reflection data memory 10 stores information of the rain/snow reflection region acquired by the rain/snow reflection determining module 8, in association with the respective addresses generated by the drawing address generating module 6.

The suppressed data memory 11 stores data of the suppressed (adjusted) levels (echo intensities) of the signals to be reflected in respective pixels on the radar image by the suppression processing module 9. The suppressed data memory 11 stores the processing result $Q_n$ obtained by the suppression processing module 9, in association with the address generated by the drawing address generating module 6.

The image creating module 12 creates display image data for displaying a radar image 90 on the display unit 13 configured by a known liquid crystal display, for example. The image creating module 12 mainly includes a suppressed data creating submodule 14, a rain/snow reflection visualizing data creating submodule 15, and a display image data creating submodule 16.

The suppressed data creating submodule 14 reads the data from the suppressed data memory 11 to acquire the level of each signal suppressed by the suppression processing module 9. Then, based on the suppressed signal level, the suppressed data creating submodule 14 associates each pixel in the region corresponding to the signal, with at least one of color information and luminance information. Thus, the suppressed data creating submodule 14 creates, as the radar image, data indicating a region where the target object (other ship 91, a land 93, etc.) is estimated to exist based on the signal level etc. (target object existing region).

In this embodiment, the suppressed data creating submodule 14 creates, as the radar image, the data (image data) expressing the region where the reflection signal remains after the suppression (target object existing region) with color or luminance corresponding to the echo intensity. Substantially, the suppression-processed radar image created by the suppressed data creating submodule 14 may be, for example, data in a form in which the position of the pixel (address) on the radar image and the color information associated to the pixel are set per pixel.

The rain/snow reflection visualizing data creating submodule 15 reads the data from the rain/snow reflection data memory 10 and the suppressed data memory 11, and acquires information of an area (i) that is determined to be in the rain/snow reflection region by the rain/snow reflection determining module 8, and (ii) from which the reception signal suppressed in level to below a threshold by the suppression processing module 9 is originated. Specifically, the area satisfying both (i) and (ii) (rain/snow reflection visualized area) is extracted from the region detected by transmitting the radio waves. Further, the rain/snow reflection visualizing data creating submodule 15 creates data for displaying the rain/snow reflection visualized area on the radar image 90 (rain/snow reflection visualizing data). In this embodiment, the rain/snow reflection visualizing data created by the rain/snow reflection visualizing data creating submodule 15 is data (image data) in which pixels in a non-transparent color (e.g., white) are arrayed in a particular pattern only in a section (area) indicating the rain/snow reflection visualized area (rain/snow reflection visualized area 97).

In a post-stage process, the rain/snow reflection visualizing data is displayed by being superimposed on the radar image, i.e., superposed on the suppression-processed radar image. In other words, in this embodiment, the rain/snow reflection visualizing data creating submodule 15 creates data indicating a particular pattern of dots, lines, or figures (in this embodiment, a pattern in which white rectangles having a size of 2×2 pixels in vertical and horizontal directions are arranged at a given interval in the vertical and horizontal directions) drawn in the section indicating the rain/snow reflection visualized area 97. Substantially, the rain/snow reflection visualizing data created by the rain/snow reflection visualizing data creating submodule 15 may be, for example, data in a form in which the position of the pixel (address) on the radar image and the color information and luminance information associated to the pixel are set per pixel.

The display image data creating submodule 16 creates data (display image data) for simultaneously displaying the rain/snow reflection visualized area 97 and the radar image illustrating the target object existing region (land 93 and/or other ship 91), based on the data created by the suppressed data creating submodule 14 and the rain/snow reflection visualizing data creating submodule 15. Specifically, the display image data creating submodule 16 of this embodiment is comprised of a superposing circuit and synthesizes an image signal of the radar image inputted thereto (suppressed data) and an image signal of the rain/snow reflection visualizing data.

Note that, in the synthesis of the image by the display image data creating submodule 16, image processing is performed so that the pattern of the rain/snow reflection visualizing data is superimposed on the radar image (i.e., the pattern described above is superposed on the suppressed data).

In this embodiment, the rain/snow reflection visualizing data is data (image data) in which the white rectangles having the size of 2×2 pixels in the vertical and horizontal directions are arranged at the interval in the vertical and horizontal directions only in the section (area) indicating the rain/snow reflection visualized area 97. By superposing this on the suppressed data expressed with the color or luminance corresponding to the echo intensity, only part (pixels) of the rain/snow reflection visualized area 97 where the white rectangles are disposed is displayed in white, and the radar image (illustrating the existence of the target objects, such as the lands 93 and the other ships 91) is displayed in the part (pixels) between the white rectangles. In other words, it can be said that the display image data creating submodule 16 creates the data so that on the radar image, the images illustrating the target objects are (partially) seen through the rain/snow reflection visualized area 97. Thus, the rain/snow reflection region which is conventionally suppressed in level and substantially cannot be seen is sufficiently displayed without excessively interrupting the images of the target objects, and a user can be provided with useful information.

The display image data created by the display image data creating submodule 16 is read by a display controlling module (not illustrated) and reflected on a display screen of the display unit 13 as the radar image. Specifically, the display screen of the display unit 13 is raster scanned by the display controlling module, and the display image data created by the display image data creating submodule 16 is read at high speed in synchronization with the raster operation, and the radar image 90 is displayed on the display screen of the display unit 13 with a display color and luminance corresponding to the display image data. Note that, an area denoted by a reference character "95" in FIGS. 2A and 2B is a rain/snow reflection area 95 where signals have intensities above a certain level even after the suppression due to a strong rain force, and is conventionally displayed in a visually recognizable mode (see FIG. 2B).

As described above, the radar apparatus 1 of this embodiment transmits the radio waves while rotating the radar antenna 2 and generates the radar image 90 based on the reflection waves of the transmitted radio waves. The radar apparatus 1 includes the receiver 3, the suppression processing module 9, the rain/snow reflection visualizing data creating submodule 15, and the display image data creating submodule 16. The receiver 3 receives the reflection waves of the transmitted radio waves. The suppression processing module 9 suppresses the level of each rain/snow reflection signal among the signals received by the receiver 3. The rain/snow reflection visualizing data creating submodule 15 creates the data for displaying, as the rain/snow reflection visualized area 97, the area in which the signal level is suppressed to below the threshold by the suppression processing module 9. The display image data creating submodule 16 creates the display image data in which the rain/snow reflection visualized area 97 created by the rain/snow reflection visualizing data creating submodule 15 is displayed on the radar image.

Thus, the rain/snow reflection region which conventionally cannot be seen is displayed visualized along with the radar image illustrating the existence of the target objects, and the user can confirm the existence of the rain cloud while also confirming the existence of the target objects on the radar image.

Since at least one or some of the land 93, the other ship 91, etc. are (partially) displayed to be seen through the rain/snow reflection visualized area 97 (see FIG. 2A), it becomes easier to visually grasp that the target objects exist in the rain/snow reflection visualized area 97. Further, since the rain/snow reflection visualized area 97 is superposed on the land 93, the other ship 91, etc. in the dot pattern, even if the region where the target objects exist overlaps with the rain/snow reflection visualized area 97, it becomes easier for the user to find out the existence of both the region and area on the radar image 90. Moreover, by displaying the existence of the rain cloud in the mode (the pattern in which the rectangles are arrayed, reference character 97) clearly different from the mode for the existence of the target object as this embodiment, the discrimination therebetween becomes easy. Furthermore, by differentiating the display color indicating the rain/snow reflection visualized area 97 from the display color indicating the target object existing region (land 93, other ship 91, etc.) on the radar image 90 as this embodiment, the rain/snow reflection region is discriminated from the target objects on the radar image 90 much more easily. Additionally, by displaying the rain/snow reflection area 95 and the rain/snow reflection visualized area 97 in white, it becomes easy to link with the rain cloud.

Next, a second embodiment is described. The second embodiment is different from the first embodiment in the data (image data) created by the rain/snow reflection visualizing data creating submodule 15, but otherwise is substantially the same as the first embodiment.

The rain/snow reflection visualizing data creating submodule 15 reads the data from the rain/snow reflection data memory 10 and the suppressed data memory 11, and acquires information of the area (i) that is determined to be in the rain/snow reflection region by the rain/snow reflection determining module 8, and (ii) from which the reception signal suppressed in level to below a threshold by the suppression processing module 9 is originated. Specifically, the area satisfying both (i) and (ii) (rain/snow reflection visualized area) is extracted from the region detected by transmitting the radio waves. Further, the rain/snow reflection visualizing data creating submodule 15 creates the data for displaying the rain/snow reflection visualized area on the radar image 90.

The display image data creating submodule 16 creates the data (display image data) for simultaneously displaying the rain/snow reflection visualized area and the radar image including the images indicating the target objects, based on the data created by the suppressed data creating submodule 14 and the rain/snow reflection visualizing data creating submodule 15.

In this embodiment, the display image data creating submodule 16 synthesizes the image signal of the radar image inputted thereto (suppressed data) and the image signal of the rain/snow reflection visualizing data.

In this synthesis, the image processing is performed so that the rain/snow reflection visualizing data (image data) is superimposed (superposed) on the radar image. Therefore, in this embodiment, the display image data creating submodule 16 processes the image data created by the suppressed data creating submodule 14 to partially (only in the rain/snow reflection visualized area 97) be semi-translucent. Even with such a combination of colors, similar effects to those in the first embodiment described above can be obtained.

Note that, the rain/snow reflection visualizing data creating submodule 15 may include a suppression level acquiring submodule 17 configured to acquire a suppressed level $S_n$ of each signal in the rain/snow reflection visualized area (a lowered amount of level (echo intensity) by the suppression at the suppression processing module 9) from the suppression processing module 9, and create data of the rain/snow reflection visualized area by differentiating transparency according to the suppressed level $S_n$. In this case, the suppressed amount of the signal level is easily acquirable by subtracting the suppressed data $Q_n$ from the level $P_n$ before the suppression at the suppression processing module 9. With this configuration, it can be estimated that in the rain/snow reflection visualized area 97, the rain cloud is thicker and the rain or snow is heavier (strong rain/snow reflections are caused) within the area where the display color is whiter and less transparent (the whiteness is emphasized more).

By displaying such a display image on the display screen of the display unit 13, the rain/snow reflection visualized area 97 is displayed without blocking the images indicating the existence of the target objects. Moreover, in the rain/snow reflection visualized area 97 on the radar image 90, rain/snow reflections are considered to be stronger as the expression of an area is emphasized more (in this embodiment, the expression which reduces the transparency and emphasizes the whiteness). Therefore, the user can estimate from the radar image the heaviness of the rain or snow in the rain/snow reflection areas 95 and 97.

Although the embodiments of this disclosure are described above, the above configurations may be modified as follows, for example.

With the radar apparatus 1 of the above embodiments, the suppression processing module 9 suppresses the level of the unnecessary signal, such as the rain/snow reflection signal, by using the scan correlation. However, the method of suppressing the unnecessary signal is not limited to this, and a known FTC (First Time Constant) processing or a CFAR (Constant False Alarm Rate) processing may be used instead. Alternatively, these processings may be combined in use.

With the radar apparatus 1 of the above embodiments, the rain/snow reflection visualized area 97 is expressed by arranging the figures (in the first embodiment, the white rectangles having the size of 2×2 pixels in the vertical and horizontal directions) in the particular pattern and the figures (white rectangles) are displayed by being preferentially superposed on the image indicating the target object existing region (land 93 and/or other ship 91). However, the "figure" here may be other than a rectangle, and may be a dot, a circle, or a polygon. Specifically, the definition of the "figure" broadly includes shapes formed by arranging a plurality of pixels (including lines and dot shapes). Therefore, the definition of the "particular pattern" broadly includes various patterns, such as hatching patterns, diagonal lines, and checkerboard patterns.

With the radar apparatus 1 of the above embodiments, when the rain/snow reflection visualizing data is created by the rain/snow reflection visualizing data creating submodule 15, the color information of "white" which is different from the display color indicating the suppressed reflection waves (the display color indicating the target objects, such as the land 93 and the other ship 91) is associated to the pixels configuring the rain/snow reflection visualized area (to be exact, the pixels forming the figure in the rain/snow reflection visualized area). However, the display color is not necessarily be supplied by the rain/snow reflection visualizing data creating submodule 15, and alternatively, the display image data creating submodule 16 may select a display color (color information) different (assign a different color) from the display color indicating the target objects.

In the above embodiments, the rain/snow reflection determining module 8 acquires the rain/snow reflection region by sequentially calculating the variation in the azimuth direction, of the reception signal level among the signals received by the receiver 3. However, alternatively, the variation of the reception signal level may be calculated in the distance direction. In this case, since the rain/snow reflection determination may be performed based on the contents in the sweep memory 5, the processing can be simplified. Alternatively, the variation of the reception signal level may be calculated in combination of both the azimuth and distance directions.

With the radar apparatus of the above embodiments, the suppression processing module 9 suppresses, not only the levels of the rain/snow reflection signals, but also the levels of other unnecessary signals (signals which are not to preferentially and explicitly be displayed on the radar image), such as a water surface reflection signal; however, it is not limited to this. Specifically, the suppression processing module 9 may have any configuration as long as it suppresses the rain/snow reflection signal. In this case, the rain/snow reflection visualizing data creating submodule 15 creates the data for displaying, as the rain/snow reflection visualized area, the area suppressed in signal level to below the threshold by the suppression processing module 9.

With the radar apparatus of the above embodiments, the rain/snow reflection determining module 8 detects the variation of the reception signal level and detects whether the reflection signals are the rain/snow reflection signals based on the variation amount. However, the method of detecting whether the signals are the rain/snow reflection signals is not limited to this, and the rain/snow reflection signals may be detected by a different method.

With the radar apparatus of the above embodiments, the rain/snow reflections are obtained to display the information of rain or snow; however, other reflections may be obtained. The "rain" and "snow" described above are merely examples of meteorological phenomena which are detectable according to this disclosure, and this disclosure may be applied to obtain information of any other kind of precipitation including drizzle, graupel, and hail.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A radar apparatus for creating a radar image based on reflection waves caused by radio waves transmitted from an antenna, comprising:
a receiver configured to receive the reflection waves of the transmitted radio waves as reception signals, the reception signals comprising precipitation reception signals corresponding to precipitation and object reception signals corresponding to one or more target objects; and
processing circuitry configured to:
suppress levels of the precipitation reception signals to below a threshold to obtain suppressed precipitation reception signals;
create data indicating, as a precipitation reflection visualized area, an area corresponding to the suppressed precipitation reception signals;
create data corresponding to the precipitation comprising color information or luminance information based on suppressed levels of the precipitation reflection signals; and
create display image data by superimposing on the radar image an image based on the data corresponding to the precipitation expressing the precipitation reflection visualized area, wherein a display mode of the precipitation reflection visualized area differs from a display mode of the radar image distinguishing the precipitation within the display image data from the one or more target objects.

2. The radar apparatus of claim 1, wherein the processing circuitry is further configured to create the display image data expressing the precipitation reflection visualized area in a particular pattern formed by arranging figures, the figures being superimposed on the radar image.

3. The radar apparatus of claim 2, wherein the processing circuitry is further configured to create the display image data expressing the precipitation reflection visualized area as a semi-translucent area, the semi-translucent area being superimposed on the radar image.

4. The radar apparatus of claim 3, wherein the processing circuitry is further configured to create the display image data indicating the precipitation reflection visualized area in a different color from a color indicating the second reception signals on the radar image.

5. The radar apparatus of claim 4, wherein the processing circuitry is further configured to suppress a level of an unnecessary signal among the reception signals by performing a scan correlation in which a level of a signal having a low correlation with a reception signal received previous thereto by the receiver is suppressed.

6. The radar apparatus of claim 5, wherein the processing circuitry is further configured to:
acquire the suppressed level of each of the first reflection signals corresponding to pixels of the precipitation reflection visualized area; and
create data indicating a position of each of the first reflection signals in the precipitation reflection visualized area in an emphasized manner based on an amount of suppression of the level of the first reflection signal.

7. The radar apparatus of claim 1, wherein the processing circuitry is further configured to create the display image data expressing the precipitation reflection visualized area as a semi-translucent area, the semi-translucent area being superimposed on the radar image.

8. The radar apparatus of claim 1, wherein the processing circuitry is further configured to create the display image data indicating the precipitation reflection visualized area in a different color from a color indicating the second reception signals on the radar image.

9. The radar apparatus of claim 1, wherein the processing circuitry is further configured to suppress a level of an unnecessary signal among the reception signals by performing a scan correlation in which a level of a signal having a low correlation with a reception signal received previous thereto by the receiver is suppressed.

10. The radar apparatus of claim 1, wherein the processing circuitry is further configured to:
acquire the suppressed level of each of the first reflection signals corresponding to pixels of the precipitation reflection visualized area; and
create data indicating a position of each of the first reflection signals in the precipitation reflection visualized area in an emphasized manner based on an amount of suppression of the level of the first reflection signal.

11. The radar apparatus of claim 1, wherein the one or more target objects comprise one or more ships or land.

12. A radar apparatus for creating a radar image based on reflection waves caused by radio waves transmitted from an antenna, comprising:
a receiver configured to receive the reflection waves of the transmitted radio waves as reception signals; and
processing circuitry configured to:
determine whether the reception signals include precipitation reflection signals corresponding to precipitation and determine an area where the precipitation reflection signals originate as a precipitation reflection area, wherein the reception signals further include object reflection signals corresponding to one or more target objects;

suppress levels of the precipitation reflection signals to below a threshold to obtain suppressed precipitation reception signals;

create data indicating, as a precipitation reflection visualized area, a region that is in the precipitation reflection area and corresponding to the suppressed precipitation reflection signals;

create data corresponding to the precipitation comprising color information or luminance information, based on suppressed levels of the precipitation reflection signals; and create display image data by superimposing on the radar image an image based on the data corresponding to the precipitation expressing the precipitation reflection visualized area, wherein a display mode of the precipitation reflection visualized area differs from a display mode of the radar image distinguishing the precipitation within the display image data from the one or more target objects.

13. The radar apparatus of claim 12, wherein the processing circuitry is further configured to create the display image data expressing the precipitation reflection visualized area in a particular pattern formed by arranging figures, the figures being superimposed on the radar image.

14. The radar apparatus of claim 12, wherein the processing circuitry is further configured to create the display image data expressing the precipitation reflection visualized area as a semi-translucent area, the semi-translucent area being superimposed on the radar image.

15. The radar apparatus of claim 12, wherein the processing circuitry is further configured to create the display image data indicating the precipitation reflection visualized area in a different color from a color indicating the second reception signals on the radar image.

16. The radar apparatus of claim 12, wherein the processing circuitry is further configured to suppress a level of an unnecessary signal among the reception signals by performing a scan correlation in which a level of a signal having a low correlation with a reception signal received previous thereto by the receiver is suppressed.

17. The radar apparatus of claim 12, wherein the processing circuitry is further configured to:

acquire the suppressed level of each of the first reflection signals corresponding to pixels of the precipitation reflection visualized area; and create data indicating a position of each of the first reflection signals in the precipitation reflection visualized area in an emphasized manner based on an amount of suppression of the level of the first reflection signal.

18. The radar apparatus of claim 12, wherein the one or more target objects comprise one or more ships or land.

* * * * *